Aug. 8, 1967 C. S. COCKERELL 3,334,609
VEHICLES OPERABLE OVER WATER
Filed Oct. 23, 1965 4 Sheets-Sheet 2
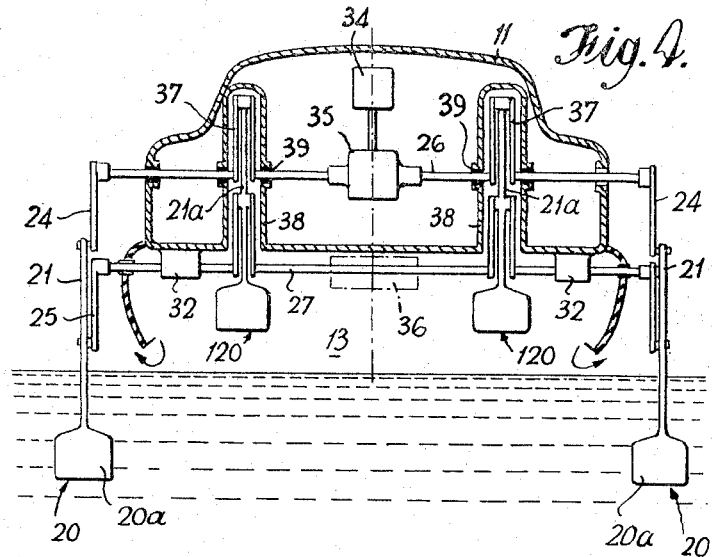
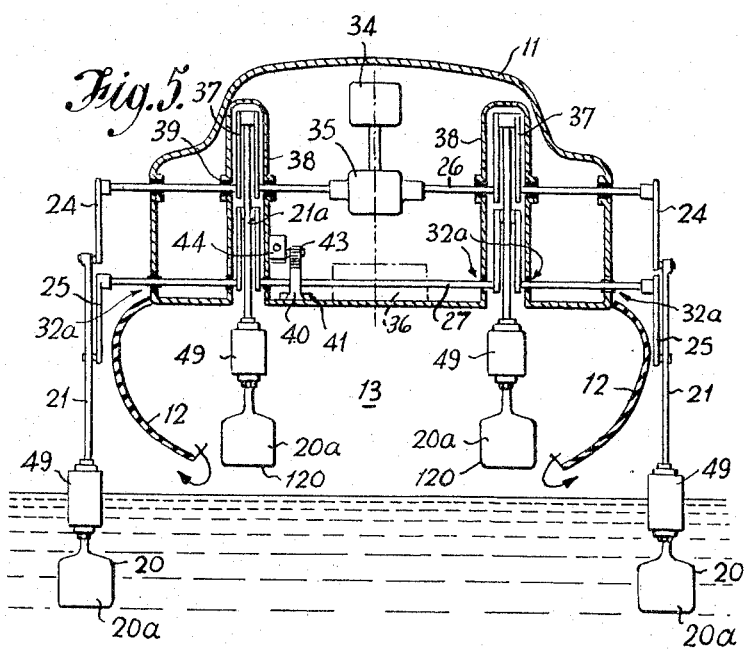
INVENTOR
C. S. COCKERELL
BY
Cameron, Kerkam & Sutton
ATTORNEYS

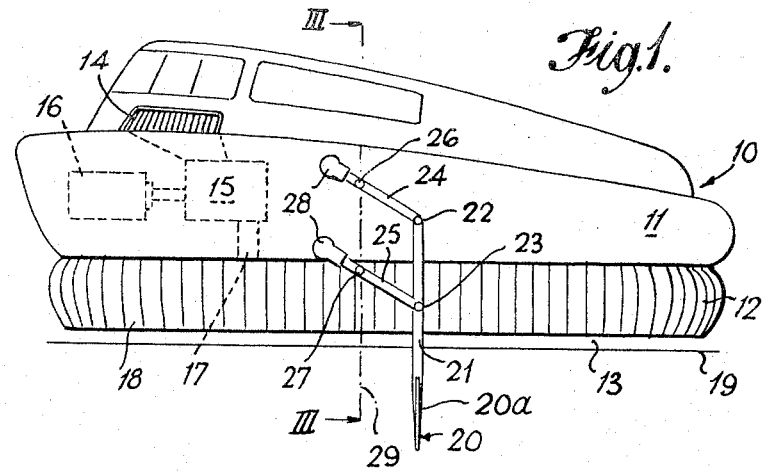
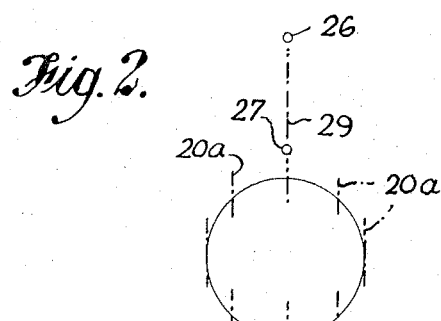
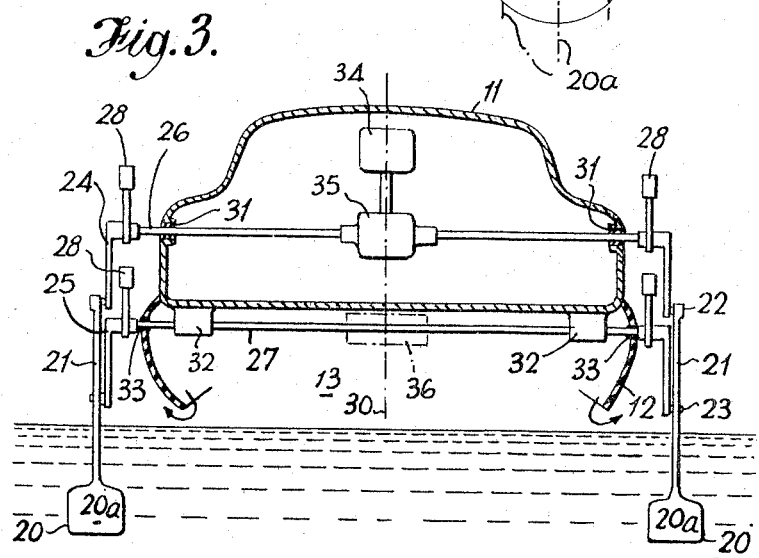

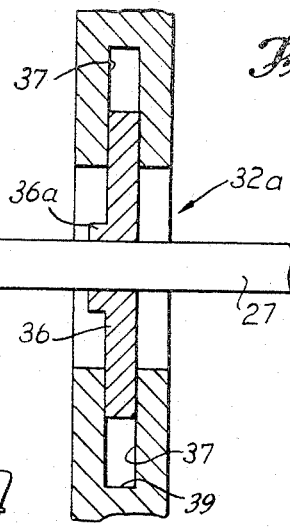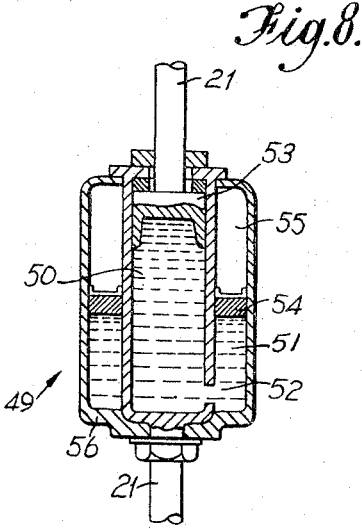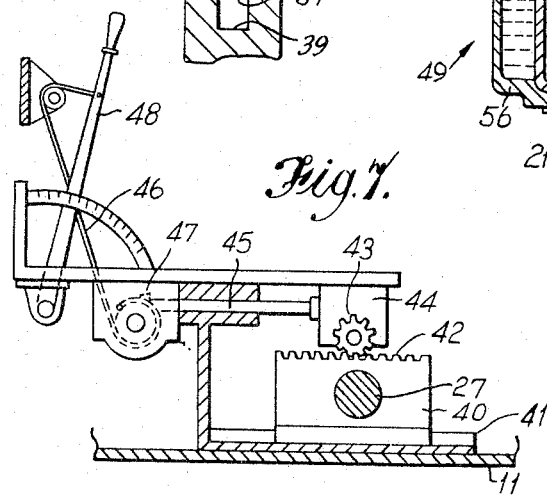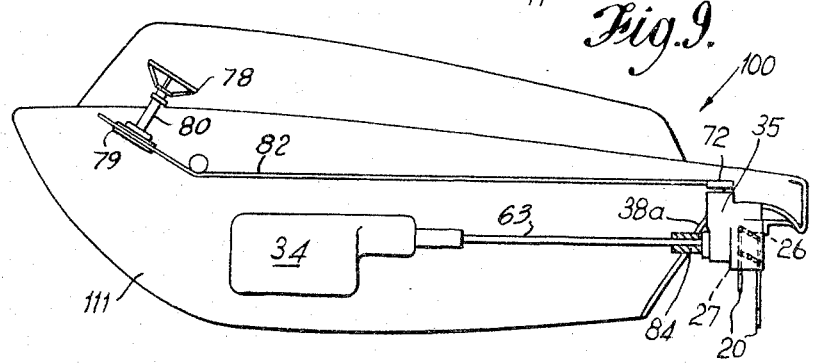

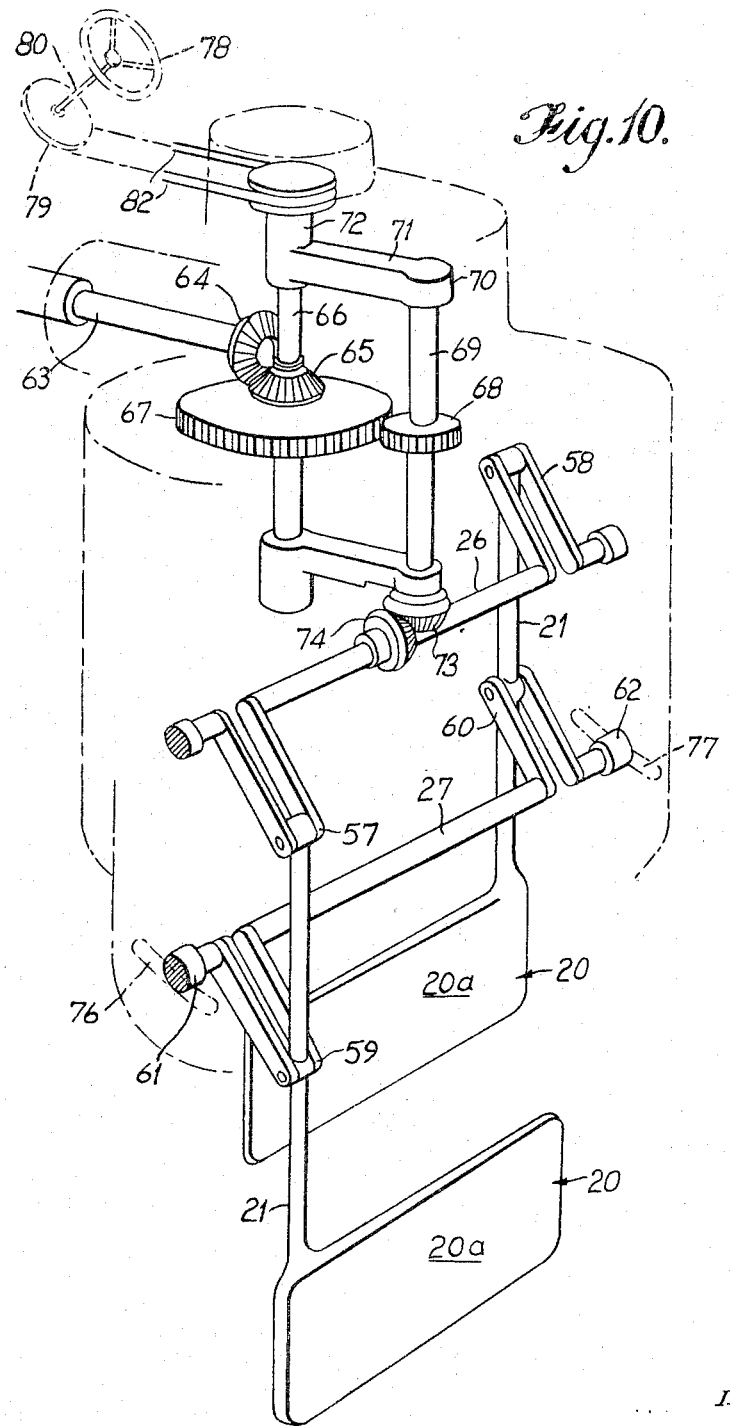

United States Patent Office 3,334,609
Patented Aug. 8, 1967

3,334,609
VEHICLES OPERABLE OVER WATER
Christopher Sydney Cockerell, Bassett, England, assignor to Hovercraft Development Limited, London, England, a British company
Filed Oct. 23, 1965, Ser. No. 502,912
Claims priority, application Great Britain, Jan. 28, 1965, 3,794/65
5 Claims. (Cl. 115—67)

ABSTRACT OF THE DISCLOSURE

A vehicle, such as an air cushion vehicle, for operation over water is propelled thereover by rotating paddles constrained to enter and leave the water in vertical directions so as to reduce loss of efficiency through splashing. The paddles are arranged to nutate about horizontal axes and also pivot about vertical axes so as to steer the vehicle by changes in the direction in which thrust is applied through the paddles to the vehicle.

---

This invention relates to vehicles operable over fluid surfaces, and to propulsion systems for such vehicles. The term "fluid surfaces" is intended to comprehend the surfaces of water, mud, soft sand, shingle and other easily penetrable surfaces. The invention is equally applicable to vehicles which displace the fluid in question and to vehicles which, in operation, are supported above the fluid surface by one or more cushions of pressurized gas formed and contained beneath the vehicle body. From time to time, hereinafter, reference will be made by way of example to the application of this invention to water, but it is to be understood that the remarks made in respect of water are intended to apply to the other fluids mentioned above.

The use of paddle-wheels for propelling a vehicle over water has several advantages over the conventional water-screw. For example, the paddle-propelled vehicle can operate in smaller depths of water than can the vehicle employing a water-screw and this superior feature makes paddle propulsion particularly attractive to the gas-cushion vehicle designer. Another advantage lies in the fact that with a water-screw a supporting structure for the water-screw must be provided which extends into the water and offers considerable resistance to motion when the vehicle is progressing at speed, whereas substantially all the water immersed parts of a paddle wheel are employed to propel the vehicle.

In an early form of paddle wheel the paddle floats were disposed so that they extended radially outwards from the wheel centre. This arrangement has, however, long been superseded by the "feathering" wheel which has a feathering centre disposed eccentric to the wheel centre to ensure that the floats nutating about the centre enter and leave the water in as near vertical positions as possible so as to reduce entry and exit losses and thus improve the propelling efficiency.

However, because the floats of the feathering paddle wheel do not enter and leave the water in truly vertical positions the efficiency of the paddle wheel suffers.

According to one aspect of the present invention there is provided a vehicle operable over fluid surfaces and which is propellable by at least one paddle float having a thrust surface arranged to thrust against the fluid, there being means constraining the paddle float so that it enters and leaves the fluid with its thrust surface substantially at a desired angle relative to the horizontal.

According to another aspect of the invention there is provided a vehicle operable over fluid surfaces and which is propellable by at least one paddle float having a thrust surface arranged to thrust against the fluid, the paddle float being pivotally connected to a rotatable support eccentrically of the axis of rotation of said support, there being driving means for rotating said support and means constraining the float so that the thrust surface always moves parallel to itself during rotation of said support. Preferably the paddle floats will enter and leave the fluid substantially perpendicularly to the mean surface of the fluid.

According to a further aspect of the invention there is provided a propulsion system for a vehicle which is to operate over fluid surfaces, the system comprising at least one paddle float having a thrust surface for thrusting against the fluid, and means constraining the paddle float so that it enters and leaves the fluid with its thrust surface substantially at a desired angle relative to the horizontal.

Embodiments of the invention, given by way of non-limitative example only, will now be described with reference to the accompanying drawings, in which:

FIGURE 1 is a side view of a gas cushion vehicle in accordance with the invention, FIGURE 2 shows various positions assumed by thrust surfaces on the paddle float during nutation about the axis of a driving shaft, FIGURE 3 is a cross-sectional view of a vehicle in accordance with the invention corresponding with the view on line III—III of FIGURE 1, FIGURE 4 is a view similar to that of FIGURE 3, but of a modified vehicle, FIGURE 5 is a view similar to that of FIGURE 4, but of a further modified vehicle, FIGURE 6 is a partial view, to an enlarged scale, on line VI—VI of FIGURE 5, FIGURE 7 is a side elevation, to an enlarged scale, of part of the vehicle shown in FIGURE 5, FIGURE 8 is a cross-section view of a resilient coupling used in the vehicle of FIGURE 5, FIGURE 9 is a cross-section view of a water-displacing boat in accordance with the invention, and FIGURE 10 shows the principal features of the propulsion system used in the boat of FIGURE 9.

In the drawings, a part which appears in more than one figure will be given the same reference numeral in each figure.

Referring to FIGURE 1, there is shown a vehicle, generally indicated by reference 10, comprising a body 11 and a wall structure or "skirt" 12 depending from the periphery of the body 11 and bounding a space 13 beneath the body 11 which, during operation of the vehicle 10, contains a cushion of pressurised gas. In this instance, the pressurised gas is air which is induced at intake 14, pressurised in a compressor 15 driven by motor 16, and discharged to space 13 via a number of vents 17 (of which only one is depicted in FIGURE 1). The skirt 12 is of the form disclosed in co-pending application Ser. No. 267,695, filed Mar. 25, 1963, now abandoned, and Ser. No. 566,948, filed July 21, 1966, and comprises a number of wall elements 18 each of which is formed from a piece of flexible sheet material, such as rubber or rubberised fabric, and is U-shaped in horizontal cross-section, the arch of the U-shape forming the boundary of the cushion space 13 while the limbs of the U-shape are disposed within the space 13 and restrain the arch against the cushion pressure. Adjacent limbs of successive elements 18 abut each other under the inflating action of the pressurised gas and prevent the escape of gas from space 13 between the wall elements 18. In operation over water, the tips of the wall elements 18 just contact the water surface 19 or define a small clearance with water surface 19 so that the escape of gas under the skirt 12 from space 13 is small.

The vehicle is propellable over the water by one or more paddle floats 20 having thrust surfaces 20a for thrusting against the water. In FIGURE 1, only one paddle float 20 is shown and it is to be understood that this paddle float may be disposed on the longitudinal centre-line of the vehicle 10 or it may be one of a pair of paddle floats 20 which are disposed on each side of the body 11.

The paddle float 20 is attached to a connecting member 21, and the connecting member 21 is pivotally attached at spaced mounting points 22, 23 along its length to respective radial arms 24, 25. Each radial arm 24, 25 is attached to a respective shaft 26, 27 and the shafts 26, 27 are substantially parallel to each other and spaced apart by a distance substantially equal to the distance between the mounting points 22, 23. In order to balance the shafts 26, 27 a counterweight 28 is attached to each shaft opposite the respective radial arm 24, 25. When one of the shafts 26, 27 is rotated about its axis, the rotational motion is communicated to the other of the shafts 26, 27 via the radial arms 24, 25 and the connecting member 21. The radial arms 24, 25 remain substantially parallel during rotation of the shafts 26, 27 because of the fixed distance between the mounting points 22, 23, and hence the connecting member 21 is maintained substantially parallel to a line 29 connecting the axes of rotation of the shafts 26, 27. In FIGURE 1, this line 29 is substantially perpendicular to the water surface 19. Hence the thrust surfaces 20a of the paddle float 20 will always be in a substantially vertical plane and will nutate about the axes of the shafts 26, 27 so as to be always parallel to itself. FIGURE 2 shows various positions of the thrust surfaces 20a during nutation about the axes of shafts 26, 27. It will be appreciated that because the thrust surfaces 20a of paddle float 20 will always be perpendicular to the water surface 19 and, as shown, will always face away from the intended direction of motion of the vehicle 10, a maximum useful area of the thrust surfaces is always available to thrust against the water. Furthermore, the paddle float 20 will enter and leave the water with its minimum cross-sectional area perpendicular to its vertical path so that a minimum of work will be expended on overcoming water resistance as the float 20 enters the water and on scooping or lifting water as the float 20 leaves the water.

In the cross-sectional view shown in FIGURE 3, it will be seen that there is a paddle float 20 disposed outside the body 11 on each side of the centre-line 30 of the vehicle 10. Each paddle float 20 is supported and driven in the same manner as the paddle float of FIGURE 1. The shafts 26, 27 are mounted on the body through bearings, the bearings 31 for upper shaft 26 being within the body 11 adjacent the sides thereof and the bearings 32 for lower shaft 27 being attached to the base of the body within the cushion space 13. The shaft 27 extends through the skirt 12 and the skirt is provided with seals 33 which surround the shaft 27 and minimise any loss of cushion gas from space 13.

Shaft 26 is driven by a motor 34 which operates via a gearbox 35. Gearbox 35 may be a simple right-angle drive gearbox providing substantially equal power for the paddle floats 20 on each side of vehicle 10. It is contemplated that gearbox 35 may also incorporate a differential gear of known type, and that shaft 27 may comprise two half-shafts united through a differential gearbox 36 (shown in chain-lines in FIGURE 3), so that the power available from motor 34 can be supplied differentially to the paddle floats 20 in accordance with the pilot's wishes. Thus by varying the power output to the paddle floats 20 on each side of the body 11, the vehicle 10 can be steered.

FIGURE 4 is a cross-section through a vehicle 10 which is similar to the vehicle 10 of FIGURE 3 but which includes a further paddle float 120 on each side of the centre-line 30 of the vehicle 10. The paddle floats 120 are attached to connecting members 21a which are rotatably mounted on cranks 37 formed on shafts 26, 27. The cranks 37 are arranged 180° out of phase with the radial arms 24, 25 so that as the shafts 26, 27 rotate, the paddle floats 120 will be at the bottom of their strokes when the paddle floats 20 are at the tops of their strokes. The paddles 20, 20a will thus provide a useful propulsion thrust over a greater part of the rotational cycle of shafts 26, 27 than would be the case in the embodiment of FIGURE 2.

The cranks 37 on upper shaft 26 are housed in a bell 38 which is open at the bottom to the cushion space 13 and the connecting members 21a operate in the bells 38. The upper shaft 26 extends through seals 39 in the walls of the bells 38 so that cushion gas cannot pass into the body 11 of the vehicle 10.

For the purpose of steering the vehicle, shaft 27 may incorporate a differential gearbox 36 and the gearbox 35 on shaft 26 may be a differential gearbox, so that the paddles 20, 20a on each side of the centre-line 30 may nutate at different speeds.

It may be desirable from time to time to vary the angle of inclination of the paddle floats 20 to the mean level of the surface 19. FIGURES 5, 6 and 7 show a vehicle 10 in which the angle of the paddle floats 20 can be varied with respect to the mean level of the surface 19.

The vehicle 10 shown in cross-section in FIGURE 5 is similar to that shown in FIGURE 4 except that the lower shaft 27 extends through the body 11 of the vehicle 10 instead of under it. The lower shaft 27 passes through the walls of the body 11 and of the bell 38 and is supported in these walls by movable bearings 32a, one of which is shown in cross-section to a larger scale in FIGURE 6. The movable bearing 32a shown in FIGURE 6 comprises a ball bearing race 36a (not shown in detail), or any other suitable support bearing, and a bearing carrier 36 in the form of a plate-like member. The bearing carrier 36 is retained in a slot 37 formed in the walls of the vehicle body 11 on each side of the carrier 36, and the distance from end to end of slot 37 exceeds the length of carrier 36 so that the carrier 36 can slide in the slot 37. The bottom surface 39 of the slot 37 is arcuate about the axis of the upper shaft 26 so that as the carrier 36 slides, taking with it the bearing 36a, no strains are set up in the connecting member 21. The slot 37 is lubricated so that sliding can take place easily and so that a substantially fluid-tight seal is maintained around the shaft 27. It will be appreciated that when the axis of lower shaft 27 is vertically below the axis of upper shaft 26, the paddle floats 20 will enter and leave the water substantially vertically. When the axes of the shafts 26, 27 are not in a vertical plane, the paddle floats 20 will be tilted from the vertical plane and nutate parallel to the plane joining the axes of the shafts 26, 27.

The movement of lower shaft 27 can be achieved in any suitable manner. FIGURE 7 shows schematically one manner of moving the lower shaft 27 in which shaft 27 is supported in a movable bearing box 40 which is slidable in a grooved member 41 attached to the body 11 of the vehicle 10. The bearing box 40 has a racked top surface 42 on which a pinion 43 is meshed, and pinion 43 is mounted on an output shaft (not visible in FIGURE 7) of a right angled gearbox 44 having an input shaft 45 which is rotated by movements of a cable 46 acting through a further gearbox 47. The movements of cable 46 are brought about by moving a hand control lever 48.

The vehicle of FIGURE 5 also incorporates a feature aimed at preventing damage to the paddle floats 20 or their driving means in the event of their striking a hard object during their nutational motion. This feature is the resilient coupling 49 incorporated in each connecting member 21 between the paddle floats 20 and the lower shaft 27. One form of resilient coupling 49 is shown in greater detail in FIGURE 8. The coupling 49 is a pressure accumulator having an inner cylinder 50 and a concentric outer cylinder 51. The inner cylinder 50 communicates with outer cylinder 51 through an orifice 52, and a liquid is confined between a circular piston 53 in inner cylinder 50, and an annular piston 54 in the outer cylinder 51. The piston 53 is attached to the lower end of an upper portion of connecting member 21, and piston 54 is free to move. A gas under a suitably high pressure is confined in space 55 between the annular piston 54 and an end wall of outer cylinder 51. The inner cylinder 50 and the outer cylinder 51 are in one unit 56 which is attached to an upper end of the lower portion of connecting member 21.

Should paddle float 20 encounter any unyielding object as it progresses downwardly, the unit 56 is forced upwardly relative to the inner piston 53 causing liquid to pass through orifice 52 into the outer cylinder 51. The annular piston 54 will move upwards in cylinder 51 and will compress the gas in space 55. The compressed gas in space 55 provides a restoring force which, when the paddle float 20 is free to move downwardly again, displaces piston 54 downwardly so that liquid passes from the outer cylinder 51 to the inner cylinder 50 and forces inner piston 53 to its uppermost extent relative to the unit 56.

The resilient coupling 49 can take other forms than that shown, and may be, for example, a spring coupling.

FIGURE 9 shows a water displacing boat 100 in accordance with the invention, having a hull 111 and a motor 34 coupled to a shaft 26 through a gearbox 35. The main components of the gearbox 35 and the drive for the paddle float 20 are shown in more detail in FIGURE 10. The shaft 26 has two spaced apart cranks 57, 58 which rotatably support respective connecting members 21 having paddle floats 20 attached at their lower ends. The paddle floats 20 are each on the inner sides of their connecting members 21 so that they follow in each other's path and thrust along substantially the same line. Below the shaft 26 is another shaft 27 having two spaced apart cranks 59, 60 on which the connecting members 21 are rotatably mounted. The pairs of cranks 57, 59 and 58, 60 for each connecting member 21 are 180° apart. Upper shaft 26 is supported by the carcase of gearbox 35 which is attached to the hull 111 of the boat 100 in any convenient manner which will be apparent to those skilled in the art. Lower shaft 27 is rotatably supported in bearings 61, 62 attached to the carcase of the gearbox 35.

Referring now to FIGURE 10, the power output shaft 63 from the motor 34 (FIG. 9) supports a bevel gear 64 which meshes with a second bevel gear 65 on a shaft 66 at right angles to power output shaft 63. Shaft 66 has a gear wheel 67 which meshes with a further gear wheel 68 on a shaft 69. Above gear wheel 68 the shaft 69 is received in, and supported by, a bearing 70 which as attached to an arm 71 radially extending from a shaft 72 which is coaxial with shaft 66 and separated therefrom by suitable bearings (not shown). The distance between the axes of shafts 66 and 69 is thus substantially equal to the distance between the axes of shafts 66 and 72, so that rotation of shaft 72 causes arm 71 to rotate shaft 69 about shaft 66. Attached at the lower end of shaft 69 is a bevel gear 73 which meshes with a bevel gear 74 on upper shaft 26 which is substantially at right angles to shaft 69. The bearings 61, 62 supporting lower shaft 27 are movably mounted in respective guides 76, 77 which are arcuate about the axis of shaft 69. Thus when shaft 72 is rotated, shaft 69 rotates about the axis of shaft 66 and shafts 26 and 27 are also able to rotate about the axis of shaft 66. It will be appreciated that the direction in which the thrust surfaces 20a face and thrust against the water will change accordingly, and therefore that shaft 72 can be rotated to steer the boat 100. The paddle floats 20 nutate about the axes of shafts 26 and 27 as the drive from shaft 63 is transmitted via bevel gears 64, 65, shaft 66 and gears 67, 68 to shaft 69, the bevel gears 73, 74, drive shaft 26 and its cranks 57, 58. The rotation of shaft 72 is under the control of a steering wheel 78 having a pulley 79 on its shaft 80, rotation of the steering wheel 78 causing movement of a pulley 81 of shaft 72 through cables 82.

Although only two paddle floats are shown in the embodiment of FIGURE 10, it will be appreciated that more than two may be provided if greater continuity of propulsive thrust is desired.

To prevent ingress of water to the hull 111 of the boat 100, the motor 34 and part of its power output shaft 63 are housed in the hull 111, while the remainder of the propulsion system is housed in a bell-like structure 38a (see FIGURE 9) which is open at the bottom to the water. The shaft 63 passes through seals 84 in the bell 38.

It will be understood that the features shown in the accompanying drawings may be used in various combinations other than those specifically described and illustrated. Furthermore, it will be apreciated that although the paddle floats 20 are particularly suited to propelling a vehicle on or over fluid surfaces, they may also be used for operation of the vehicle over hard land surfaces.

I claim:
1. A vehicle operable over fluidsurfaces and which is propellable by at least one paddle float having a thrust surface arranged to thrust against the fluid, comprising at least two rotatable support means having spaced apart parallel axes of rotation arranged in a substantially straight line, at least one of said support means being movably mounted in the body of the vehicle, means for moving the movably mounted support means relative to the body of the vehicle whereby the angle between said straight line and the horizontal can be varied, driving means for rotating at least one of said rotatable support means about its axis, connecting means connected to said rotatable support means through bearing means which are eccentric of said axes, the distance between said bearing means being substantially equal to the distance between the corresponding axes of rotation, said paddle float being rotatably mounted on said connecting means on bearing means enabling the float to be rotated about an axis which is parallel to said straight line, whereby when the rotatable support means is rotated about its axis the paddle float is so constrained that the thrust surface thereof always moves parallel to itself, and steering means connected to said paddle float operable to cause rotation of the paddle about its axis whereby the direction of thrust of the paddle can be altered for steering the vehicle.

2. A vehicle according to claim 1 and including means for forming and maintaining a cushion of pressurised gas beneath the vehicle.

3. A vehicle operable over fluid surfaces and which is propellable by at least one propulsion system on each side of the longitudinal centre-line of the vehicle, each propulsion system comprising at least one paddle float having a thrust surface arranged to thrust against the fluid, at least two rotatable support means having spaced apart parallel axes of rotation arranged in a straight line, driving means operable to rotate at least one of said rotatable support means about its axis, connecting means mounted on the supporting means by pivotal connections, the distance between pivotal connections of at least two rotatable support means being substantially equal to the distance between the axes of rotation of said two rotatable support means, said paddle float being attached to said connecting means whereby operation of the driving means will cause the float to nutate with its thrust surface always parallel to itself, the driving means of the propulsion systems being capable of causing the floats on each side of said centre-line to nutate at differing speeds whereby the resultant direction of thrust on the vehicle can be varied.

4. A vehicle according to claim 3 and including means for forming and maintaining a cushion of pressurised gas beneath the body of the vehicle.

5. A vehicle according to claim 3 and including means movably mounting at least one of the support means to the body of the vehicle, and means for moving said support member relative to the body of the vehicle, whereby the angle between said straight line and the horizontal can be varied.

References Cited

UNITED STATES PATENTS

| | | | |
|---|---|---|---|
| 568,499 | 9/1896 | Spann | 115—66 |
| 1,287,890 | 12/1918 | Hill | 170—140 |
| 2,940,415 | 6/1960 | Schwarzer | 115—67 |
| 3,189,115 | 6/1965 | Rethorst | 114—67 |

MILTON BUCHLER, *Primary Examiner.*

ANDREW H. FARRELL, *Examiner.*